(12) United States Patent
Wong et al.

(10) Patent No.: US 8,473,485 B2
(45) Date of Patent: Jun. 25, 2013

(54) ORGANIZING SEARCH HISTORY INTO COLLECTIONS

(75) Inventors: Sandy Wong, Seattle, WA (US); Derrick Connell, Seattle, WA (US); Ravi Soin, Kirkland, WA (US); Andrew Shuman, Seattle, WA (US); Marek Latuskiewicz, Kirkland, WA (US); Jun Yin, Bellevue, WA (US); Kim Vlcek, Redmond, WA (US); Yinghua Yao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/172,256

(22) Filed: Jun. 29, 2011

(65) Prior Publication Data

US 2013/0006952 A1 Jan. 3, 2013

(51) Int. Cl.
 *G06F 17/30* (2006.01)
(52) U.S. Cl.
 USPC .................................. 707/721; 707/E17.069
(58) Field of Classification Search
 USPC ................. 707/708, 721, 759, 765, 766, 767, 707/771
 See application file for complete search history.

(56) References Cited

U.S. PATENT DOCUMENTS

| 7,359,894 B1* | 4/2008 | Liebman et al. ...................... 1/1 |
| 2006/0064411 A1 | 3/2006 | Gross et al. |
| 2006/0167852 A1 | 7/2006 | Dissett et al. |
| 2008/0082518 A1 | 4/2008 | Lostesness |
| 2008/0114759 A1 | 5/2008 | Yahia et al. |
| 2008/0288494 A1 | 11/2008 | Brogger et al. |
| 2008/0313281 A1 | 12/2008 | Scheidl et al. |
| 2009/0172551 A1* | 7/2009 | Kane et al. ..................... 715/733 |
| 2009/0327267 A1 | 12/2009 | Wong et al. |
| 2010/0042610 A1* | 2/2010 | Lakhani et al. ................... 707/5 |
| 2010/0223581 A1 | 9/2010 | Manolescu et al. |
| 2010/0235788 A1 | 9/2010 | Zappa et al. |
| 2010/0287178 A1 | 11/2010 | Lambert et al. |
| 2011/0307883 A1* | 12/2011 | Hilerio et al. ................. 717/176 |

OTHER PUBLICATIONS

Tan, et al., "Mining Long-Term Search History to Improve Search Accuracy", in Proceedings of the 12th ACM SIGKDD international conference on Knowledge discovery and data mining, 2006, 6 pages.

(Continued)

*Primary Examiner* — Robert Beausoliel, Jr.
*Assistant Examiner* — Nirav K Khakhar
(74) *Attorney, Agent, or Firm* — Shook, Hardy & Bacon LLP

(57) ABSTRACT

Computer-storage media, methods, and systems for improving the ability of a user to accomplish a task that is pending during a search session are provided. This pending task can be distilled by identifying a current searching intent associated with a recently submitted query and by determining which candidate tasks are most comparable to the current searching intent of a user. The candidate tasks are mined from a search history of the user by categorizing those navigation events that appear to share a semantically common concept. Upon performing a comparison, the candidate task that captures the user's true current searching intent is designated as the pending task. When a user invokes the pending task, a collection of elements that are associated with the pending task are dynamically organized into a sharable content page, thereby providing a collaborative experience that involves exposing the collection to contacts and accepting feedback therefrom.

20 Claims, 10 Drawing Sheets

OTHER PUBLICATIONS

Bilenko, et al., "Mining the Search Trails of Surfing Crowds: Identifying Relevant Websites from User Activity", In Proceeding of the 17th international conference on World Wide Web, 2008, 10 pages.

Notification of Transmittal of the International Search Report and the Written Opinion of the International Searching Authority, or the Declaration mailed Oct. 24, 2012 in PCT/US2012/39790; 9 pages.

* cited by examiner

ORGANIZING SEARCH HISTORY INTO COLLECTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, there exists a plurality of services that offer a vast variety of utilities that assist a user in searching the Internet for information. Typically, this information is delivered from a search engine, operated by the service, to a web browser located on a user's computing device in the form of search results. These search results are often similarly formatted within a search-results page and fail to address and/or advance an underlying task that the user is seeking to accomplish.

Increasingly, users conduct searches to accomplish "tasks," such as reserving a table at a restaurant, renting an online movie, purchasing a book, or booking a trip. These tasks can be performed in association with various entities (e.g., people, places, and things) or various actions (e.g., buy, sell, rent, and the like). For example, during the course of a search session, the user's pending task may be general in nature, such as planning a trip or ordering a pizza. Or, the task may be refined by involving specific entities and/or actions, such as specifying parameters of an entity (e.g., limiting the search context to cameras less than $200, finding flights into only San Francisco, or purchasing an original movie released in 2005 and not the 2009 remake) or specifying an action related to the entity (e.g., renting a movie as opposed to buying).

When a user is attempting to carry out a task, conventional search engines only provide the user a laborious requirement that demands that the user actively tag items within the search session if they are to be stored and recalled at a later point in time. By way of example, the tagged items may be used to compile a list (e.g., where tags may be selected for links to goods that can be compiled into a registry for a wedding). Because most users fail to take the time to actively tag items, these requirements of conventional search engines result in both a poor user search experience and a failure of the conventional search engines to optimally recognize the user's searching intent.

Accordingly, a system for implicitly gleaning the user's searching intent during a search session, without requiring explicit user feedback that particularly specifies a current task, and for surfacing features that are specific to the user's task would provide a way for the system to showcase its understanding of the user's searching intent and to assist in advancing the goal(s) of the pending task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for improving the ability of a user to accomplish a task during a search session. As mentioned above, a conventional search engine requires a user to manually trigger the conventional search engine to begin watching online actions taken by the user (e.g., actively tagging links). Subsequently, the conventional search engine may aggregate all the online actions into a single rudimentary list with no ability to intelligently distinguish between separate tasks or tagged links. Exemplary embodiments of the present invention solve this deficiency by providing technology that is capable of detecting a searching intent of the user, selecting one or more predefined tasks that capture semantic aspects of the searching intent, creating a collection of elements that are associated with the task, and putting in place a collaborative experience that involves sharing the collection with friends and accepting feedback therefrom.

In instances, improving the ability of the user to accomplish a task involves carrying out various steps. Initially, a log that maintains a user's search history may be mined. Typically, the log includes a current query being searched, links that have been clicked through, web pages or URLs that have been visited, and any other navigation events that have been taken by the user. Upon mining the log, the search history may be categorized into candidate tasks that generally represent the user's previous searching intents, respectively, when the user was conducting prior search sessions.

A pending task may also be distilled by identifying a current searching intent underlying a recently submitted query and by determining which of the candidate tasks are most comparable to the current searching intent of the user. The candidate task that is most comparable to the current searching intent may be designated as the pending task within the system. This designated task is then employed to compile a collection of related elements that may promote the user's progress on the pending task.

In embodiments, based on a topic or theme of the pending task, portions of the user's search history may be automatically filtered and organized into a collection. In this way, the collection includes elements drawn from the user's search history and/or elements automatically suggested by the system that may help the user in completing the pending task. By way of example, the elements of the collection may include links to helpful websites recommended by the system, links to information previously reviewed by the user, images of entities associated with the task, and data extracted from one or more online documents. It should be appreciated and understood that the scope of the theme or topic of some possible collections contemplated by the present invention may include one or more of the following: Mother's Day gift ideas; Halloween-party drinks; prom dress ideas; camera research; individual/group trip to Paris; individual/group night out in Seattle; movie rental for Saturday night; and funny online videos.

BRIEF DESCRIPTION OF THE DRAWINGS

The present invention is described in detail below with reference to the attached drawing figures, wherein.

DETAILED DESCRIPTION

Figure 1:
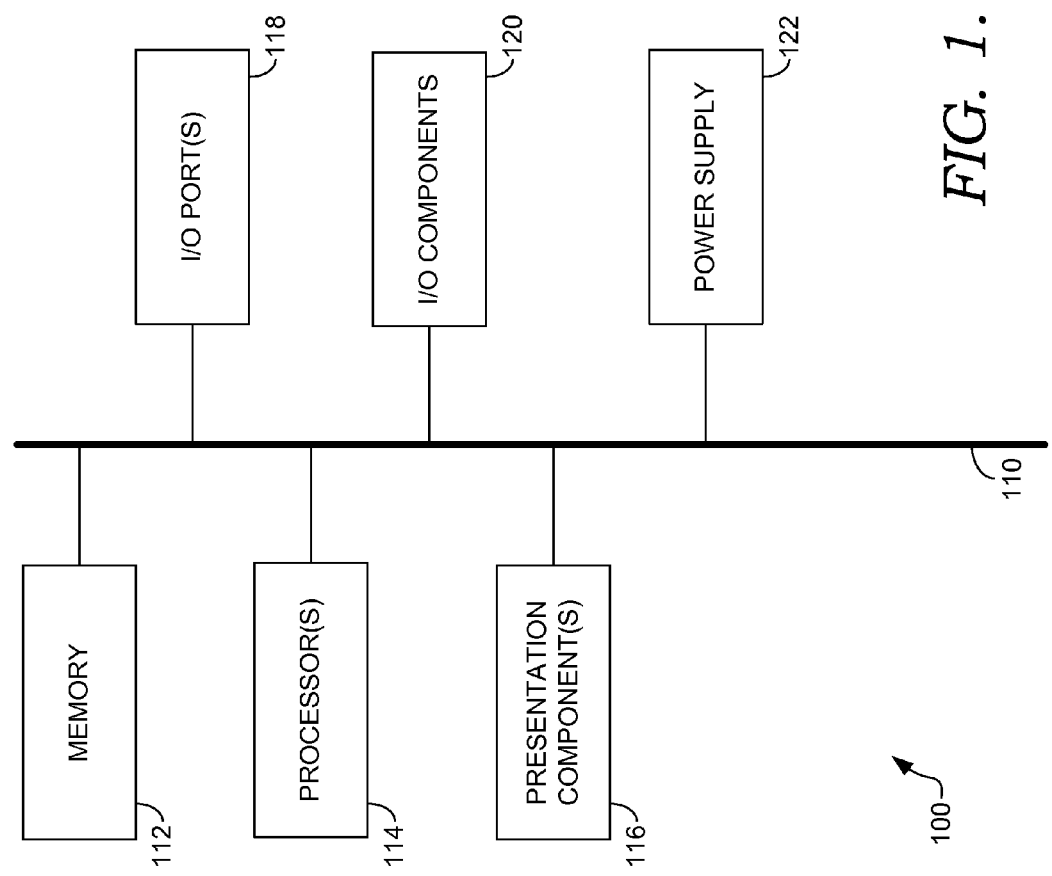
FIG. 1 is a block diagram of an exemplary computing environment suitable for use in implementing embodiments of the present invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally embodiments of the present invention pertain to various operations that identify a pending task of a search session and generate a collection that relates to the pending task. These various operations may include gleaning a user's searching intent from the navigation events the user has undertaken, distilling a specific task from the searching intent, and generating a collection that supports the advancement and eventual completion of the task. Generally, a user interacts with a search engine when conducting a search session. During this interaction, the user may perform a sequence of actions (e.g., perform various navigation events) that informs the search engine about the user's true searching intent (i.e., providing context beyond just a single query). Further, the sequence of actions provides the search engine an understanding of the precise task that the user is trying to perform. Accordingly, the sequence of actions can be used to determine a relevant task that is pending within the search session. Once the task is determined, the search engine may automatically form suggestions that relate to the task. For instance, a user-initiated search for the specific entity (e.g., a restaurant) may trigger the search engine to suggest information relevant to the entity, such as a restaurant's location (e.g., street, city, and state), food type, price range, etc. As such, this relevant information may be gathered and published in a collection that assists the user in advancing the task of "planning a night out."

As can be gleaned from the disclosure above, various embodiments of the present invention involve identifying task(s) from user search actions and rendering the indentified task within search results of a search-results page. Often, the search results are generated and surfaced on a user-interface (UI) display through the employment of task-based engines (e.g., decision engines, task engines, individual applications or operations, applet systems, operating systems, and task-based mobile systems), or general systems that allow a user to accomplish tasks by establishing collections that are relevant to user intent. For simplicity of discussion, these engines and/or systems will be hereinafter referred to as "search engines."

Accordingly, in one aspect, the present invention provides one or more computer-storage media having computer-executable instructions embodied thereon that, when executed, perform a method for gathering related navigation events for publishing in a collection. The phrase "navigation events" is not meant to be interpreted narrowly and may include such items as queries, clicked-through links, and/or websites that have been visited. In some embodiments, the navigation events are drawn from a search history stored in a log associated with the user. In other embodiments, the navigation events are drawn from searching behavior stored in a log associated with the general population or with various users that are demographically/characteristically similar to the user.

Initially, the method involves receiving a query that is typically submitted by a user at a web-browser application, which is in operable communication with a search engine. The user's searching intent may be distilled from the query. In an exemplary embodiment, at least one relevant task may be automatically determined via a process that includes at least the following steps: comparing the searching intent of the user against a plurality of predefined tasks; and designating one or more of the predefined tasks that match the searching intent as the relevant task(s). The method may continue by presenting on a UI display a representation of the relevant task(s) and detecting a user-initiated selection directed toward the representation of the relevant task(s). Incident to detecting the user-initiated selection, an online document that includes the collection of elements that are related to the relevant task(s) may be dynamically generated.

In another aspect, a computerized method is provided for identifying and sharing a task that captures a user's searching intent. In embodiments, the method includes the steps of mining one or more candidate tasks by analyzing a log of the user's search history. Typically, the candidate tasks each represent a semantic concept that is abstracted from at least one navigation event within the search-history log. At some point, a recently received query may be compared against the candidate task(s). Upon comparison, a relevant task may be identified from the candidate task(s), where the relevant task corresponds with a searching intent of the query.

The method may further include the step of exposing a representation (e.g., link, widget, module on a task bar, or instant answer) of the relevant task to the user. Incident to the user targeting a selection-action to the relevant-task representation, a sharable content page, or task-results page, associated with the relevant task may be automatically exposed. Typically, the sharable content page includes elements that reflect navigation events drawn from the user's log of search history or suggestions of web pages that share a semantically common concept with the relevant task.

As more fully discussed below, the exposed representation of the relevant task may include a control that allows the user to post a link of the sharable content page to one or more contacts via a social network. Generally, the user is enabled to choose which contacts s/he prefers to receive feedback from regarding the sharable content page when completing the relevant task. Further, the sharable content page is capable of publishing comments provided by the contacts upon the contacts invoking the posted link and submitting feedback.

In yet another embodiment of the present invention, a computer system is provided for recognizing that a user is carrying out a task and for providing a collection of elements that advances the task. By way of system architecture, the computer system comprises a processing unit coupled to a computer storage medium that stores a plurality of computer software components executable by the processing unit. The computer software components may include a query classifier, a collections component, a search engine, and a user experience (UX) layer.

Initially, the query classifier is configured for passively recognizing, during an ongoing search session, a searching intent of a navigation event recently implemented by the user within the search session. By way of example, the navigation event may be a query submitted by a user that requests information about flights to Paris. The collections component is configured for categorizing navigation events previously implemented by the user into one or more candidate tasks (e.g., planning a trip, buying a phone, investing in options, and the like) and for selecting a task from the candidate task(s) that is relevant to the user's searching intent (e.g., the task "plan a trip to Paris" of FIG. 5). The search engine is configured for generating search results that are responsive to a query submitted by the user, while the user experience layer is configured for rendering a representation of the relevant task in conjunction with the search results within a search-results page. Upon detecting a user-initiated selection of the relevant-task representation, the collections component may be further configured for composing a sharable content page using suggested elements that relate to the relevant tasks and for distributing the sharable content page to some of the user's contacts within a social network. With reference to the example above, the sharable content page may include such suggested elements as links to travel websites, images of Paris, recommended places to visit, links to or URLs of web pages the user has previously visited, and Paris hotel prices automatically extracted by the collections component, as more fully discussed below with reference to FIG. 2.

Having briefly described an overview of embodiments of the present invention and some of the elements featured therein, an exemplary operating environment suitable for implementing the present invention is described below.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Technology introduced by embodiments of the present invention for automatically distilling a task being carried out by a user and for generating a collection based on the distilled task will now be discussed with reference to FIG. 2. Generally, this technology employs a variety of techniques to help disambiguate user intent during a search event. One of these techniques involves determining the entity in which the user is truly interested. Upon distilling the search event into one or more entities of interest, those entities may be used to glean the user's overall, pending task. Thus, the exemplary techniques described below help match one or more predetermined, candidate tasks with a user's searching intent using the concept of "entities," such that the user-intent disambiguation techniques for making the match are sufficiently transparent to the user.

As discussed above, tasks being carried out as a result of user interaction with a search engine may be learned by the search engine upon comparing a user's searching intents with a list of candidate tasks. In exemplary embodiments, a variety of abstract objects (e.g., entities, entity classes, entity domains, and actions) are employed to recognize the user's searching intent underlying an ongoing search session. Generally, these "abstract objects" operate as actionable tasks, actions, and/or entities that cannot be adequately managed through simple keywords of a query. That is, abstract objects consider the context of a user's navigation event, which exposes the user's true searching intent, as opposed to employing just keyword-matching techniques, which do not always target the user's searching intent. As used herein, the term "entities" generally refers to logical objects that may be represented by a particular online description. These logical objects may be a person, place, thing, or any combination thereof. For instance, some examples of logical objects are the following: the movie Avatar; the restaurant Shiva's; the CEO of Microsoft™; the Alaska Airlines' flight #AS331; and the Canon PowerShot™ digital camera.

Another type of abstract object used to learn the user's searching intent are "entity classes," which generally refer to a set of entities that share a common property. For instance, entity classes include sets of entities grouped by one or more shared properties or parameters. Examples of entity classes include movies directed by James Cameron; restaurants located in Mountain View, Fortune 500 companies, flights into Seattle, and electronics products. In operation, when the user's search intent during a navigation event points to an entity class, those specific entities within the purview of the entity class would be used to glean the user's searching intent in combination with the entity class. Further, the entities or entity classes may assist the collections component in categorizing the user's search history into a number of predefined tasks that may be subsequently compared against the user's searching intent.

By way of example, if it is determined that the user's query targets the entity "digital cameras under $200" when conducting an online search, the system of the present invention may elect to match the targeted entity to the specific task of "shopping for cheap digital cameras." However, if, upon examination of the user's search history, it is determined the user has recently requested search results for the entity class of "digital cameras," the system may select and display the general task of "shopping for digital cameras," which likely corresponds with the user's true search intent. In this way, the system attempts to find the best fit between the entity or entity class of the query and the entity or entity class of related previous navigation events. Accordingly, the task that is determined to be relevant to the query is comprehensive in scope such that it captures any additional data from the user's search history that may generate a robust collection on the sharable content page, which reflects the user's broadest searching intents.

Along these lines, entity classes may be broadly categorized to form entity domains, which reside on a higher level of abstraction than entity classes. These "entity domains" represent general groupings covering a wide scope of entities and serve as general divisions between the entity classes. For example, entity domains may include, but are not limited to, the following examples: cars, movies, businesses, transportation, and shopping. Accordingly, entity domains represent the highest-level classifier of entities within the hierarchy of entity domains, entity classes, and individual entities. Thus, in operation, the system may employ one or more of the entity domains, entity classes, and/or individual entities to glean the user's searching intent and to discover the most relevant task in light of past searches.

Further, inherent to many entity domains are entity actions. As used herein, the phrase "entity actions" is not limited to any particular actions, but broadly refers to one or more online actions a user performs via user interactions with a search engine. Often, entity actions address an entity, an entity class, and/or an entity domain. By way of example, within the movie domain, some exemplary entity actions may include the actions of buy, rent, stream, watch trailer, read reviews, and book tickets. When conducting a search event, a user may apply one or more of these entity actions to entities (e.g., the movie Avatar) or to entity classes (e.g., movies directed by James Cameron). In another example, in the entity domain related to dining/restaurants, some exemplary entity actions that may be applied include the actions of make reservation, read menu, or map directions. When conducting a search event, a user may apply one or more of these entity actions to entities (e.g., the restaurant Shiva's) or to entity classes (e.g., restaurants in Mountain View).

Thus, as discussed above, a sequence of entity actions that are implemented within at least one search session may combine to indicate a general task (e.g., plan night out or order take-out) or a specific task (e.g., plan a trip to Paris). In embodiments, the "general task" is associated with an entity class or entity domain and covers a broad scope of navigation events. Accordingly, when there exists a significant variety between the queries that a user has submitted during a search session, for example, a general task may be targeted as the most relevant task for that search session. In other embodiments, the "specific task" is associated with a single entity and covers a narrow scope of navigation events. Accordingly, when the queries that a user has submitted during a search session are focused on a particular person, for example, a specific task may be targeted as the most relevant task for that search session.

As used herein, the term "task" relates to high-order concepts that describe a user's searching intent underlying the searching activities performed by a user during at least one search session. As such, tasks represent a single semantic concept that captures the implicit meaning of navigation event(s) taken by and/or entity action(s) issued by the user. Typically, the system is capable of determining a relationship between the navigation events and the entity actions, as well as distilling the common attributes of the navigation events and the entity actions, thereby quickly learning the most relevant task being pursued by the user.

Figure 2:
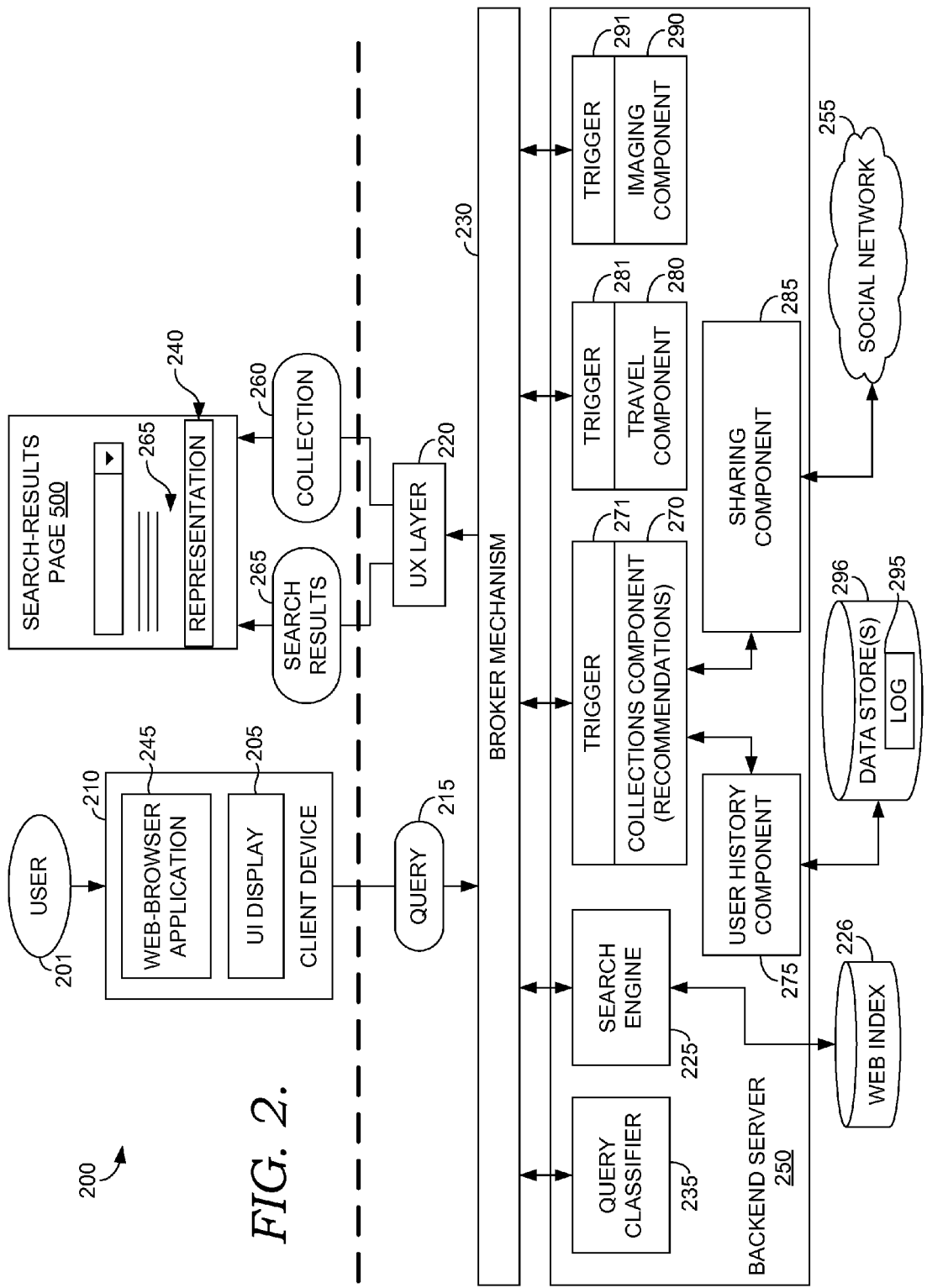
FIG. 2 is a schematic diagram of an exemplary system architecture suitable for use in implementing embodiments of the present invention, in accordance with an embodiment of the present invention.

Turning now to FIG. 2, a block diagram is depicted that illustrates an exemplary system architecture 200 of a distributed computing environment, suitable for use in implementing embodiments of the present invention. Generally, implementing embodiments of the present invention relate to improving a users' ability to complete a pending online task by employing a collection of useful elements that are drawn from various sources. It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a client device 210, a UX layer 220, a broker mechanism 230, a backend server 250, a web index 226, data store(s) 296, a social network 255, and a network (not shown) that interconnects each of these items. Each of the client device 210, the data store(s) 296, and the backend server 250 shown in FIG. 2, may take the form of various types of computing devices, such as, for example, the computing device 100 described above with reference to FIG. 1. By way of example only and not limitation, the client device 210 and/or the backend server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., search engine 225, query classifier 235, collections component 270, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes (e.g., interfacing with the data store(s) 296 to access a log 295 of the user's search history) and other operations (e.g., employing the user-history component 275 to furnish a list of candidate tasks derived from the user's search history). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the backend server 250 may include one or more of the following software components or modules: the search engine 225 that interfaces with a web index 226 to retrieve search results 265, the query classifier 235, the collections component 270, the user-history component 275, a travel component 280, a sharing component 285, and an imaging component 290.

The client device 210 may include an input device (not shown) and a presentation device (not shown). Generally, the input device is provided to receive input(s) affecting, among other things, a presentation of the search results in a browser window surfaced at a GUI display area. Illustrative devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool (e.g., mouse pointer) hovering over the search results and badges that are responsive to the query.

In embodiments, the presentation device is configured to render and/or present a UI display 205 thereon. The presentation device, which is operably coupled to an output of the client device 210, may be configured as any presentation component that is capable of presenting information to a user, such as a digital monitor, electronic display panel, touchscreen, analog set-top box, plasma screen, audio speakers, Braille pad, and the like. In one exemplary embodiment, the presentation device is configured to present rich content, such as the browser window that includes the UI display 205 populated with search results 265 and including a representation 240 of a task. In another exemplary embodiment, the presentation device is capable of rendering other forms of media (e.g., audio signals). In yet another exemplary embodiment, the presentation device may present such illustrative UI displays as a homepage 400 (see FIG. 4) configured for accepting a query 215 from a user, a search-results page 500 (see FIG. 5) that includes the representation 240 of a relevant task distilled from a search session, a task-results page 600 (see FIG. 6) for managing various recent tasks, the posting 700 (see FIG. 7) that is distributed via a social network 255, and a domain task page 800 (see FIG. 8) that includes representations of elements that are related to the relevant task.

The data store(s) 296 are generally configured to store information to support determination of a relevant task and generation of a collection 260 for the relevant task. For instance, the data stores may include the log 295 that maintains a user's search history. In various embodiments, the information stored in the data store(s) 296 may also include, without limitation, metadata extracted from web pages, searching behavior tracked from a general population of users, a profile of the user that stores information (e.g., demographics) of the user, and any other information that pertains to embodiments of the present invention.

In addition, the data store(s) 296 may be configured to be searchable for suitable access of the stored information and configured to grant write access thereto. For instance, the data store(s) 296 may be searchable for previous navigation events that are written to the user's search-history log 295. It will be understood and appreciated by those of ordinary skill in the art that the information stored in the data store(s) 296 may be configurable and may interact with the user-history component 275. The content and volume of such information are not intended to limit the scope of embodiments of the present invention in any way. Further, though illustrated as single, independent components, the data store(s) 296 may, in fact, be a plurality of databases, for instance, a database cluster, portions of which may reside on the client device 210, the backend server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of a client device 210, a UX layer 220, a broker mechanism 230, a backend server 250, a web index 226, data store(s) 296, a social network 255, as illustrated. In some embodiments, one or more of the components 225, 235, 270, 275, 280, 285, and 290 may be implemented as stand-alone devices. In other embodiments, one or more of the components 225, 235, 270, 275, 280, 285, and 290 may be integrated directly into the backend server 250, or on distributed nodes that interconnect to form the backend server 250. It will be understood by those of ordinary skill in the art that the components 225, 235, 270, 275, 280, 285, and 290 (illustrated in FIG. 2) are exemplary in nature and in number and should not be construed as limiting.

Accordingly, any number of components may be employed to achieve the desired functionality within the scope of embodiments of the present invention. For instance, the travel component 280 and the imaging component 290 are merely illustrated for purposes of description and, in reality, a multitude of similarly situated components (e.g., online shopping component, plan-a-night-out component, and the like) may exist to generate a robust collection 260. Further, although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one social network 255 is shown, many more may be communicatively coupled to the sharing component 285).

Further, the devices of the exemplary system architecture may be interconnected by any method known in the relevant field. For instance, the backend server 250 and the client device 210 may be operably coupled via a distributed computing environment that includes multiple computing devices coupled with one another via one or more networks. In embodiments, the network may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 225, 235, 270, 275, 280, 285, and 290 are designed to perform a process that is capable of detecting a user's searching intent, identifying a task that encompasses the searching intent, creating a collection that serves to advance the task toward completion, and establishes a collaborative experience (e.g., sharing and receiving feedback over the social network 255) surrounding the collection.

Initially, the search engine 225 is configured for crawling a web index 226 to retrieve a plurality of search results 265.

In embodiments, the web-browser application 245 running on the client device 210 is generally configured to access and communicate with the search engine 225 running on the backend server 250. For instance, access to the search engine 225 may be accessed by the user 201 providing an appropriate uniform resource locator (URL) address to the web-browser application 245 that targets the search engine 225. In another instance, communication may be established via an Internet (e.g., the World Wide Web) or an intranet (e.g., internal system to the communications network) connection. Once connected in operable communication, the web-browser application 245 may be configured to convey the query 215 to the search engine 225 and receive search results 265 in return. In an exemplary embodiment, the search engine 225 is responsible for receiving the query 215 from a web-browser application 245, generating search results 265 that are responsive to the query 215, and delivering the search results 265 to the web-browser application 245 for rendering on the search-results page 500.

In an exemplary embodiment, the query classifier 235 is responsible for detecting a searching intent of the user 201. As mentioned above, conventional search engines required explicit input, or positive action, from a user to articulate their intentions during an online search (e.g., actively tag items to fill a shopping cart or wish lists) and to allow the conventional search engine to recognize those intentions. In contrast, embodiments of the present invention offer the query classifier 235 that functions to auto-detect a user's searching intent from the navigation events (e.g., submitted queries, clicked-through links, or visited websites) conducted during one or many search sessions. That is, the query classifier 235 does not rely on the user to advertise their need for an organization mechanism.

Initially, the search engine passively tracks the navigation events of the user 201 and uses the navigation events to update the user's log 295. By way of example, the search engine 225 may detect that the user 201 has arrived upon a specific URL during a search session and adds the URL to the search history of the log 295. Eventually, the memory of the log 295 is mined for selection of a relevant task and/or for contributing to the collection 260. In one instance, the information within the minable memory of the log 295 is limited to navigation events of the ongoing search session, the last N-number of search sessions, the current query 215 and the last N-number of queries, and the like.

Automatically, and without any user initiation, the query classifier 235 mines for candidate tasks (i.e., a list of suggestions for collections) from the search history of the minable memory of the log 295. At some point prior to the user 201 submitting the query 215, the query classifier 235 may have categorized and indexed the user's search history, if available, into predefined tasks that act as candidates for the relevant task of the query 215. Accordingly, when the search-history log 295 is up-to-date, the query classifier 235 may make personalized suggestions to the user 201. Otherwise, when the search-history log 295 is not accessible, includes insufficient data, or is compromised in any fashion, the query classifier 235 may make generalized suggestions (using search behavior of the general population) or semigeneralized suggestions (using search behavior of users with aligned interests or users that are demographically situated with the user 201). Further, in embodiments, the query classifier 235 may examine the search-history log 295 in isolation or in combination with the search behavior of the general population and/or similar people.

Upon categorizing the aggregate or recent portions of the search history in the log 295, various candidate tasks may be auto-extracted from the categorization. In one instance, the candidate tasks are auto-extracted by taking abstractions of the user's search history, or by employing the abstract objects (e.g., entities, entity classes, entity domains, and actions), which are more fully described above. Once the candidate tasks are established, the user's broader intentions underlying the query 215 may be understood by comparing an abstraction (e.g., searching intent) of the query 215 against the candidate tasks to identify those corresponding candidate task(s) that are relevant. In embodiments, the relevant task(s) are inferred from the query 215 as the candidate task(s) that topically match, or exhibit a semantically common concept as, the abstraction of the query 215. For example, if the user 201 has conducted several previous online searches for hotels and flights with regard to the destination of Paris, then a task that can be assumed to be relevant to a current query for a restaurant in Paris may be "planning a trip to Paris." Eventually or in parallel, a collection may be generated for the upcoming trip to Paris that may include elements pertaining to a flight, a hotel, images of the destination, etc.

Once the relevant task is targeted by the query classifier 235, it may be suggested to the user 201 in a variety of ways. These suggestion(s) of the relevant task are employed to solicit the user's interest in creating a collection 260. In embodiments, a representation 240 of the relevant task may be surfaced on the search-results page 500 with the search results 265. In this way, UX layer 220 automatically issues a prompt that is incorporated within search results 265 and showcases the query classifier's 235 ability to identify the user's actual searching intent. As discussed below, this prompt may be configured as a widget (see reference numerals 510 and 520 of FIG. 5) that notifies the user that at least one task is being recommended. Further, the widget may include functionality. For instance, when the user 201 performs a click-through on the widget, a sharable content page is automatically composed with the elements of the collection 260. Thus, the widget serves as both an entry point to the collection 260 and a trigger to generate the collection 260.

Figure 5:
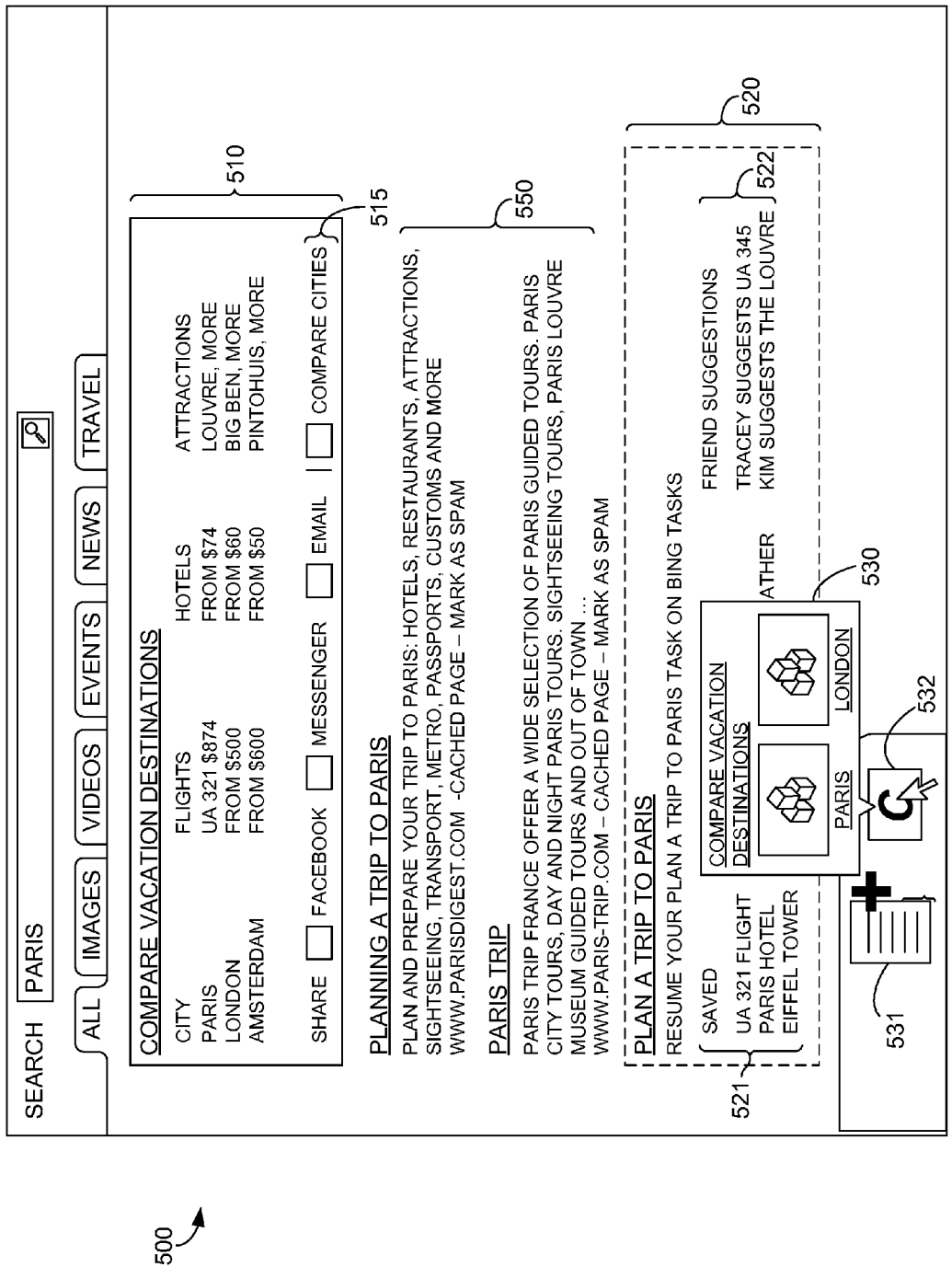
FIG. 5 is a schematic diagram depicting a second illustrative UI display of the search-results page that includes representations of a relevant task distilled from a search session, in accordance with embodiments of the invention.

In other embodiments, the user 201 may be prompted to manually select the relevant task from a list of suggested tasks at a task bar (see reference numeral 530 of FIG. 5). In embodiments, the task bar that includes modules that, upon monitoring user interaction, reveal information (e.g., data about a collection or comparison) concerning the relevant task(s). Typically, as indicated below with respect to FIG. 5, the modules 531 and 532 on the task bar are dynamically modified in accordance with a context of an ongoing search session.

Incident to the user 201 activating the relevant task (e.g., opening a link on the representation 240 or selecting a module on the task bar), or in parallel with identifying the relevant task, the components 270, 280, and 290 convert in real-time the relevant task into the collection 260. In an exemplary embodiment, the components 270, 280, and 290 are actively watching the user's response to the prompts for suggested tasks and, upon detecting an actuation of one of the prompts, commence generating the collection 260. The triggers 271, 281, and 291 of the components 270, 280, and 290, respectively, allow the components 270, 280, and 290 to impose self-trigger logic and selectively participate in the compilation of the collection 260. In this way, the triggers 271, 281, and 291 examine the selected task (e.g., intelligently distributed by the broker mechanism 230) and act to invoke one or more of the components 270, 280, and 290 if they are to contribute to the collection 260.

In one instance, when the trigger 271 is activated, the collections component 270 pulls relevant URLs the user has already visited and/or information from the log 295 (e.g., flights, hotels, and the like) that are related to his/her task (e.g., planning the trip to Paris), if applicable. In another instance, when the trigger 281 is activated, the travel component 280 auto-suggests other travel-related elements (e.g., museums, parks, and restaurants in Paris) that are encompassed within the topic or theme of the relevant task yet not present within the log 295. Similarly, when the trigger 291 is activated, the images component 290 auto-suggests other image-related elements (e.g., images taken in Paris) that are encompassed within the topic or theme of the relevant task yet not present within the log 295.

Although various different selectively participating components for automatically generating a collection have been described, it should be understood and appreciated that other types of suitable components that suggest collection elements related to the task may be used, and that embodiments of the present invention are not limited to those components 270, 280, and 290 described herein. For instance, a comparison component may be hosted on the backend server 250 that is triggered during a product search and, upon being triggered, recommends competitive products that are relevant to the task (i.e., aligned with the search intent) yet outside the scope of the query. Thus, the comparison component would allow the user 201 to evaluate one product against another comparable product.

The broker mechanism 230 harvests the elements (e.g., relevant links from the user's search history and/or recommended related data) offered from the components 270, 280, and 290 then filters, merges, and organizes the elements to form the collection 260 in accordance with formatting rules. In one instance, the formatting rules may dictate that the queries published in the collection 260 are restricted to the last N-number of queries in the user's search history that relate to the task. The UX layer 220 uses the collection 260 to create a shareable content page (see task-results page 600 of FIG. 6).

The sharable content page is typically not static and may be manually or automatically updated. In one way, the sharable content page is manually updated by engaging the user to provide feedback that alters the elements of the collection 260. In another way, the sharable content page is configured to automatically update the collection by detecting another navigation event relevant to the task underlying the collection 260 and incorporating an element representing the new navigation event within the collection 260. In embodiments, the user 201 may be provided an indication that an element is added, deleted, or altered within the collection 260.

Figure 3:
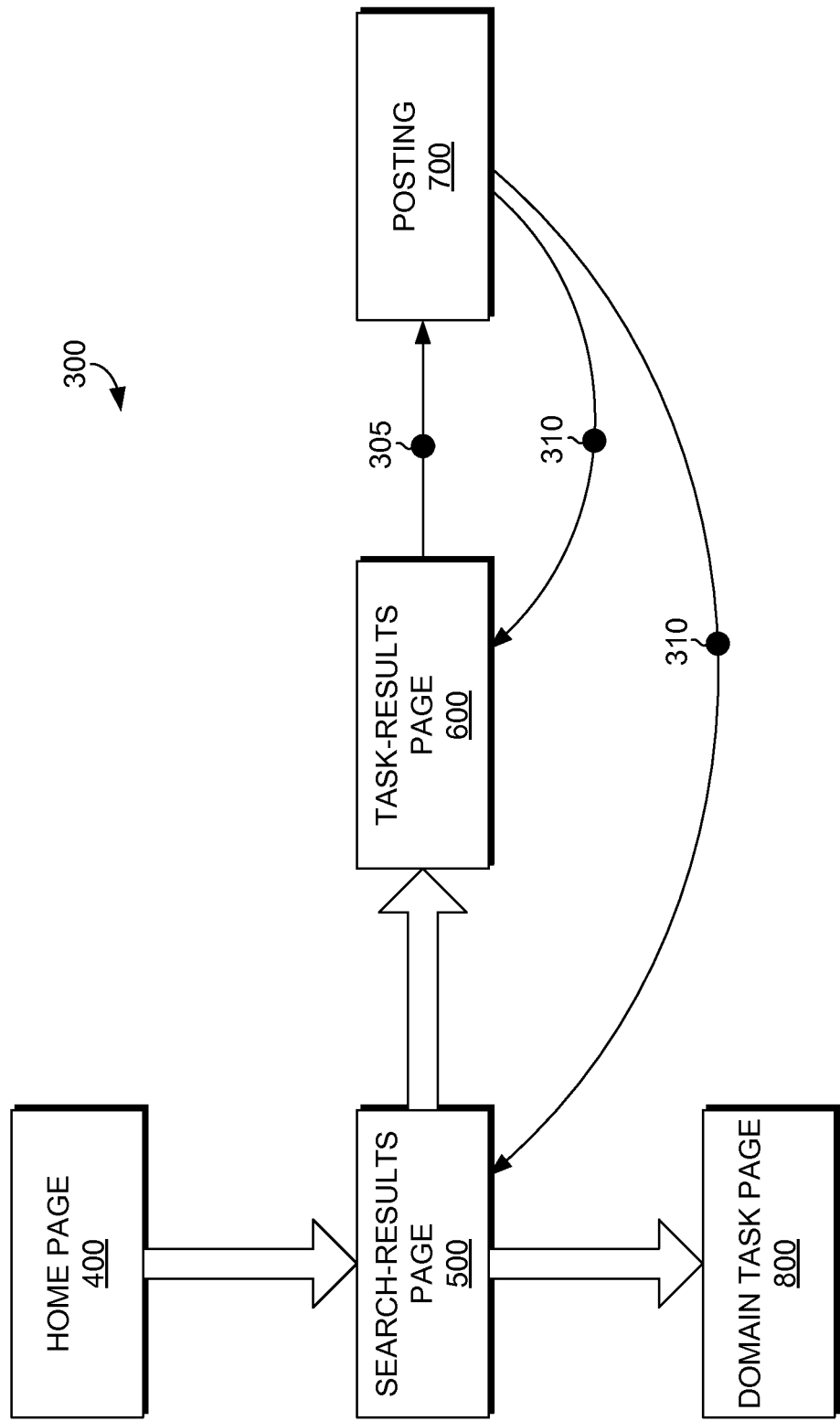
FIG. 3 is a diagrammatic user-interface workflow upon a user navigating between a search-results page to a task-results page, in accordance with an embodiment of the present invention.

With reference to FIG. 3, a diagrammatic user-interface workflow 300, upon a user navigating between a search-results page 500 to a task-results page 600, is shown and shall be described in accordance with an embodiment of the present invention. Initially, a homepage 400 is published by a search engine where a user may submit a query to the search engine for consideration. In response, the search engine may generate the search-results page (SERP) 500 that includes search results and, potentially, a representation of a task that is relevant to, inter alia, the submitted query.

From the search-results page 500, the user may select a link or widget that takes the user to a domain task page (DTP) 800. In general, the domain task page 800 provides an online document that exposes a full web-page experience. For instance, the online document of the domain task page 800 may organize elements of the collection to provide informative content and suggestions for advancing the task to completion.

Also, with reference to the search-results page 500, the user may select a link on the display area (e.g., right rail) or module on the task bar that accesses or generates the task-results page (TERP) 600, or "shareable content page," which manages a selection of the user's tasks and/or shows at least one collection. These tasks and/or collections may be selected for display on the task-results page 600 using any combination of criteria (e.g., most recently pursued tasks or most frequently accessed tasks). In embodiments, each of the selected tasks may be rendered as a rich answer (e.g., including various types of content).

One or more of the collections may be shared to contacts or friends of the user over a social network, such as the social network 255 of FIG. 2. For instance, the user may leverage the capabilities of their social network(s) to share the collection using a network-specific mechanism to connect their acquaintances. By way of example, for some social networks, the network-specific mechanism would allow a user to select a control at the task-results page 600 that would add a new post 305 on a wall of a contact. Typically, the post 305 includes at least a link to the collection and a message to view and comment on the collection. In operation, when a contact clicks through the link, the contact may arrive at the collection and, if permission is granted by the user, add information or make a comment.

In another example, the network-specific mechanism would allow a user to explicitly express their intention to share a task by tagging it within the task-result page 600. In yet another example, the network-specific mechanism might automatically issue a prompt to the user to share one or more tasks with a friend. Further, the network-specific mechanism may offer the user account governance that monitors activity of their contacts, or friends, with respect to the shared collections/tasks. This account governance may be imposed, for example, by applying a resource ID that identifies information initiated by the contacts on their respective social networks.

Advantageously, the interaction between the pages 600 and 700 allow for contacts of the user to collaborate on a task via feedback 310, such as comments and other information (e.g., additional URLs that are relevant to elements of the collection). In embodiments of the present invention, mechanisms are put in place to allow for intercommunication with a wide audience and for organizing the feedback 310 by threads. In instances, these threads from contacts on the social network are merged with the elements of the collection for purposes of starting a conversation related to the task.

Figure 4:
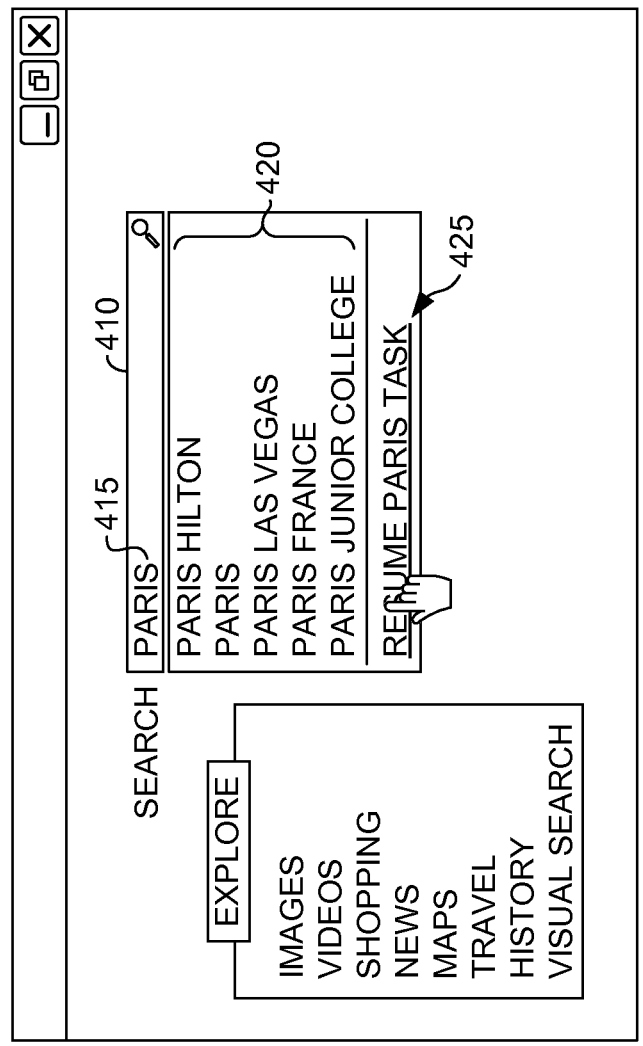
FIG. 4 is a schematic diagram depicting a first illustrative UI display of a homepage configured for accepting a query from a user, in accordance with embodiments of the invention.

Turning to FIG. 4, a schematic diagram depicting a first illustrative UI display of a homepage 400 configured for accepting a query 415 from a user is shown, in accordance with embodiments of the invention. As discussed above, the homepage 400 provides a search box 410 to receive a user-submitted query 415. During entry of the query 415, a drop-down menu or pop-up menu may be surfaced that includes related searches 420. In exemplary embodiments, the menu may also include a link 425 that allows the user to resume a previous task related to the query.

Turning to FIG. 5, a schematic diagram depicting a second illustrative UI display of the search-results page 500 that includes representations 510 and 520 of respective relevant tasks ("compare vacation destinations" and "plan a trip to Paris") distilled from a search session are shown, in accordance with embodiments of the invention. By way of background, the relevant task of "compare vacation destinations" illustrated in representation 510 is distilled from a previous query for London in light of the current query for Paris. That is, the system of the present invention determines the user's searching intent behind the most-recent query with respect to the navigation events stored in the search history, where the stored navigation events are drawn from the ongoing search session (e.g., with respect to the task "compare vacation destinations") and/or past search sessions (e.g., with respect to the task "plan a trip to Paris"). In this case, the user's searching intent is determined to relate to comparing trips to cities in Europe based on the queries for both London and Paris occurring within the same search session.

On a first time that a particular searching intent is gleaned for the user, the representation 510 of the relevant task "compare vacation destinations" may be issued within the search results 550 of the search-results page 500. As shown, the representation 510 includes suggested flights, hotels, and attractions for not only the current query (Paris), but for auto-generated recommendations that are deemed to have a semantically common concept (London and Amsterdam). In one instance, the recommendation of London is pulled from the user's search history log (e.g., using the collections component 270 of FIG. 2), while the recommendation of Amsterdam is offered from searching behavior of similarly situated people (e.g., using the travel component 280 of FIG. 2). Further, the representation 510 may include one or more controls 515 that can be used to share the relevant task of "compare vacation destinations" with others using a variety of vehicles (e.g., posting on a wall of a social network, sending to a recipient an SMS message, or emailing details of the relevant task). These vehicles for sharing, when actuated, invoke the sharing component 285 of FIG. 2 to serve as an interface between the user and the social network or any other selected communication technology. Further, the controls 515 may include a link or button that allows the user to append, remove, or replace cities that are considered in the comparison for preferred vacation destinations of the user.

On subsequent times that a searching intent is gleaned for the user, the representation 520 of the relevant task "plan a trip to Paris" may be issued within the search results 550. The representation 520 includes information 521 that the user has previously saved to a collection related to this relevant task in combination with auto-suggested links to data that one or more components 270, 280, and 290 of FIG. 2, upon being triggered, have supplied. Also, the representation 520 may include feedback 522 from one or more contacts on the user's social network (e.g., using the sharing component 285 of FIG. 2) that have been previously appended to this task's collection. Generally, the feedback 522 only appears when the following conditions are true: the user has previously posted a link to the collection via a social network or another communication technology, friends of the user have commented on or provided information to the collection in the interim, and the user has granted permission to publish the friends' feedback at the collection.

In addition, the search-results page 500 includes a task bar 530 that typically resides at a bottom of the search-results page 500, although the location of the task bar 530 may vary across web-page formats. In embodiments, the task bar 530 may be selectively hidden from view by the system to optimize content on the search-results page 500, or may be selectively shown when determined to be applicable to enhance the user's searching experience. Further, the task bar 530 may be configured to transcend across various webpages while the user is conducting the search session. In one instance, the phrase "selectively hidden" generally refers to the capability of the task bar 530 to disappear from view and then automatically or manually reveal itself (e.g., slide out onto a display area of the search-results page 500) at appropriate times. By way of example, the task bar 530 may reveal itself upon a relevant task being distilled by the query classifier 235 of FIG. 2 and rendered as a representation within the search results 550 using the UX layer 220 of FIG. 2.

When revealed to the user, the task bar 530 surfaces one or more modules that prompt the user with itemized suggestions. As illustrated, the exemplary modules 531 and 532 are dynamically surfaced in the task bar 530 and are configured to be contextually relevant to the task "compare vacation destinations." In a particular instance, the module 531 serves as an interface that allows a user to easily manage elements and/or content of a collection while continuing to visit the search-results page 500. In another instance, the module 532 displays rich content that helps the user carry out the task of "compare vacation destinations" by making readily available such features as a book-a-flight link, images of the cities considered in the comparison, and popular attractions recommendations. However, it should be noted that the task bar 530 is not limited to the modules 531 and 532, and may progressively change sizes (expand or contract) based on user engagement or based on which modules are dynamically imported to the task bar 530, as a function of the parameters of the search session and/or the type of task that is currently the focus of the user.

In operation, user-initiated selection directed to either of the modules 531 or 532 may add, delete, or modify content to the collection in the form of elements, as mentioned above. For instance, a selection directed toward the module 532 may insert the images of Paris and/or London, surfaced by the module 532 upon hovering with a cursor, as elements to the collection. Accordingly, the modules 531 and 532 provide powerful controls for rapidly updating the content of the collection without actually navigating the user to the collection itself.

Figure 6:
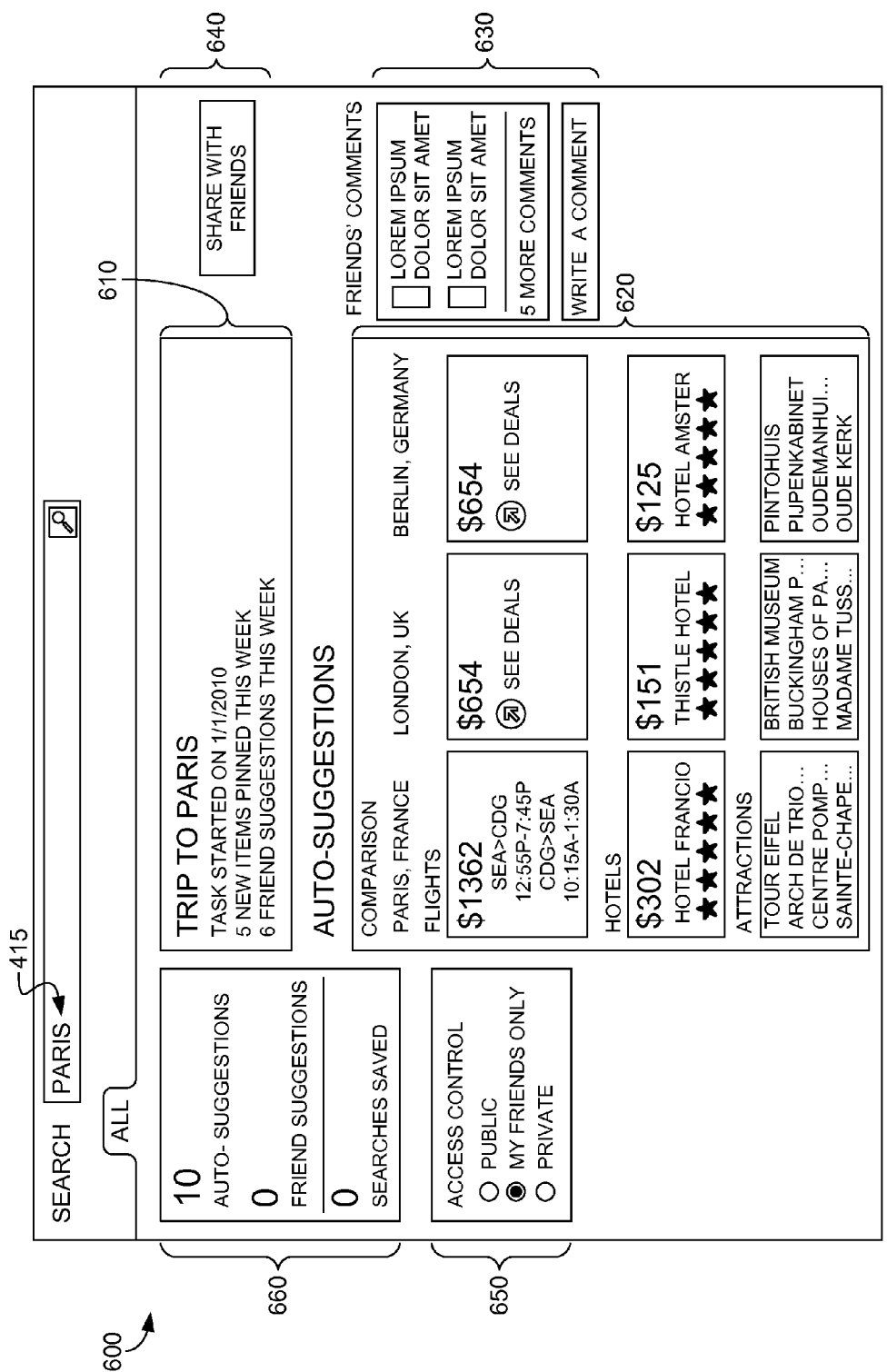
FIG. 6 is a schematic diagram depicting a third illustrative UI display of the task-results page that includes representations of elements that are related to the relevant task, in accordance with embodiments of the invention.

Turning now to FIG. 6, a schematic diagram depicting a third illustrative UI display of the task-results page (TERP) 600 (i.e., sharable content page) that includes representations of elements that are related to the relevant task is shown, in accordance with embodiments of the invention. Generally, the task-results page 600 allows the user to manage elements of at least one collection. As shown, the elements include a task record 610, auto-suggestions 620, a bulletin-board tool 630, a sharing control 640, an access control 650, and a status indicator 660. Initially, the task record 610 exposes to the user various pieces of information regarding the progress of the task. For instance, the task record 610 may expose such information as the time and date the task was identified by the system, the number of elements that were recently added to the collection, and the number of comments that were recently provided by friends of the user.

The auto-suggestions 620, in instances, relate to elements that were automatically added by the system to the collection. As illustrated, these elements relate to the task "trip to Paris" and include a comparison of flights, hotels, and attractions for various destinations. In an exemplary embodiment, the auto-suggestions 620 may be generated by the components 270, 280, and 290 of FIG. 2 without any manual input from the user.

The bulletin-board tool 630, in embodiments, exposes a forum at which friends, contacts, and/or acquaintances of the user may post comments via a social network or any other communication technology. The sharing control 640 typically serves as a selectable button or link that facilitates posting an indication of the collection on one or more profiles within the social network. Once the indication of the collection is posted, the access control 650 may be used to deny, restrict, or allow access to the collection. For instance, the access control 650 may be adjusted to allow a set of preauthorized people to provide feedback to the collection, while allowing members of the general population to view the collection. The status indicator 660 serves to track and present the source and number of inputs made to the collection. As illustrated, the status indicator 660 is showing that the elements of the collection reflect ten inputs from the system, while no elements of the collection reflect inputs from either the user or the user's friends.

Figure 7:
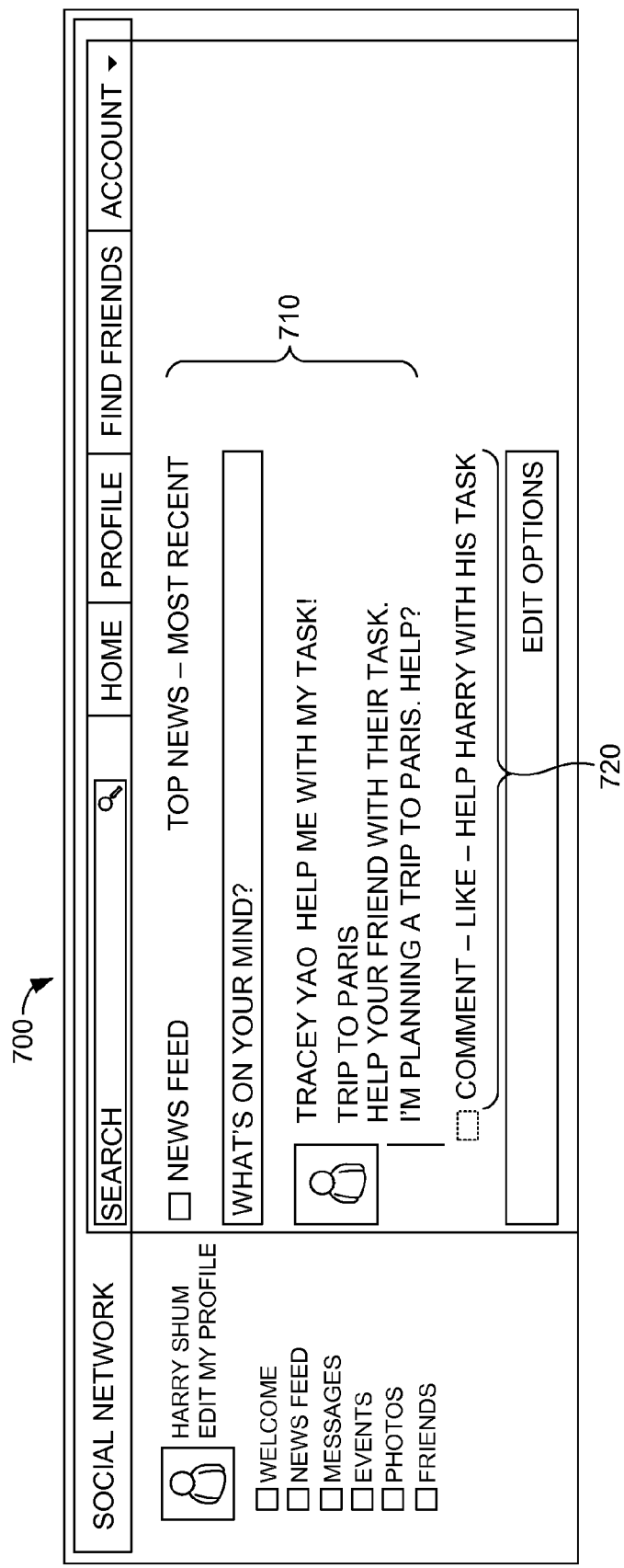
FIG. 7 is a schematic diagram depicting a fourth illustrative UI display of a posting at a social network, in accordance with embodiments of the invention.

With reference to FIG. 7, a schematic diagram depicting a fourth illustrative UI display of a posting 700 at a social network is shown, in accordance with embodiments of the invention. Generally, the posting 700 allows the collection(s) of a user to be shared to friends of the user over a social network, such as the social network 255 of FIG. 2, thereby allowing collaboration with others on a pending task. As illustrated, the posting 700 appears on a wall of a friend within a social network and includes a message 710 and a link 720. The message 710 typically informs the friend of the task (e.g., articulating a description of the task) and solicits the friend to provide feedback in the form of comments and/or links to useful online locations. The link 720 typically directs the friend to a secured version of the task-results page 600 that allows the friend to view the content of the collection and add preauthorized elements thereto.

By way of example, for some social networks, the network-specific mechanism would allow a user to select a control at the task-results page 600 that would add a new post 305 to on a wall of a contact. Typically, the post 305 includes at least a link to the collection and a message to view and comment on the collection. In operation, when a contact clicks through the link, the contact may arrive at the collection and, if permission is granted by the user, add information or make a comment.

Figure 8:
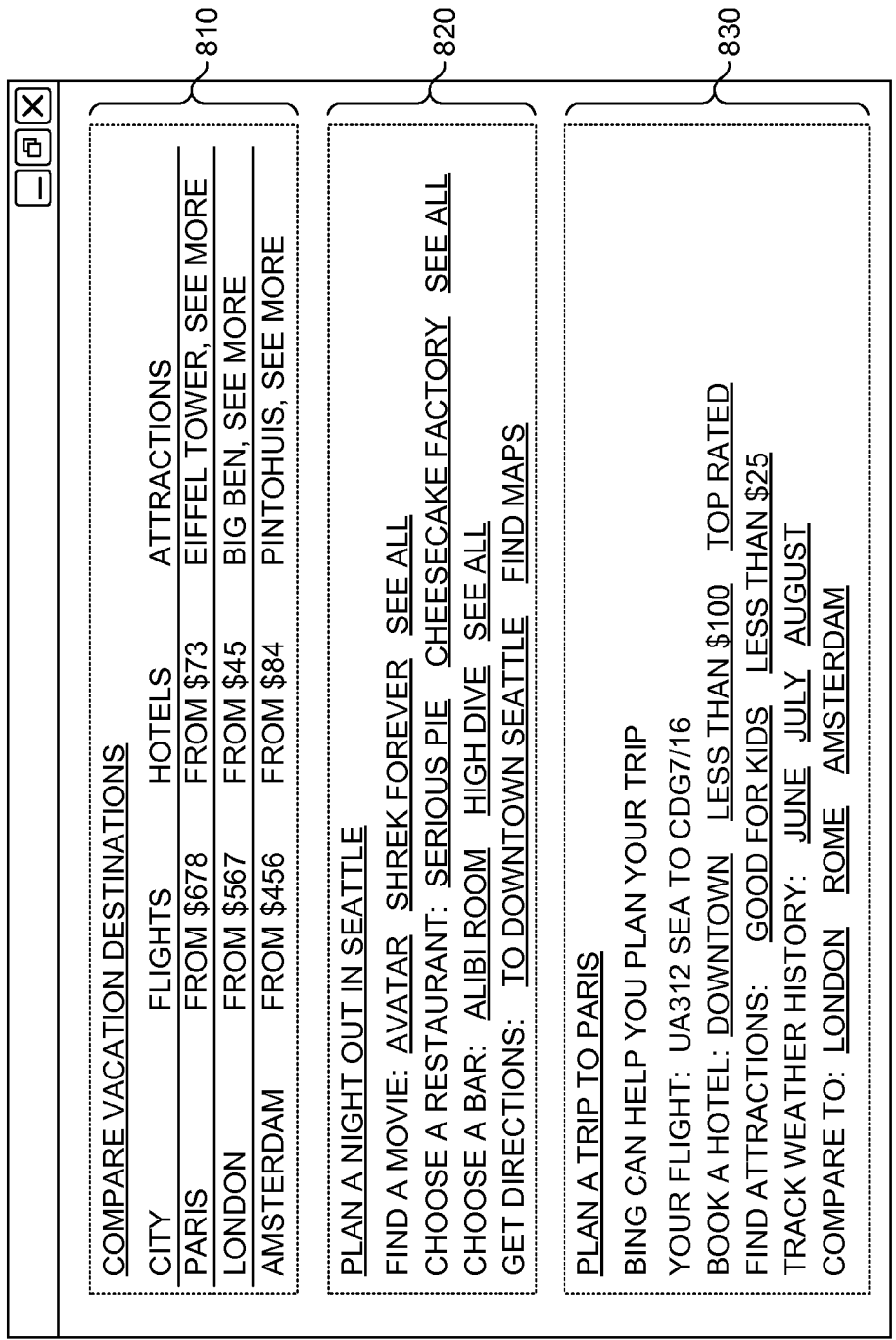
FIG. 8 is a schematic diagram depicting a fifth illustrative UI display of a domain task page for managing tasks, in accordance with embodiments of the invention.

Referring to FIG. 8, a schematic diagram depicting a fifth illustrative UI display of a domain task page (DTP) 800 for managing various tasks is shown and will now be discussed in accordance with embodiments of the invention. In general, the domain task page 800 provides an online document that exposes a full web-page experience. For instance, the online document of the domain task page 800 may allow the user to organize elements of the collection to highlight informative content and rearrange suggestions for advancing the task to completion. As illustrated, the domain task page 800 may be used to manage pending tasks in addition to editing content and/or elements of a task. As shown, the user is enabled to view and manage the tasks of "compare vacation destinations," "plan a night out in Seattle," and "plan a trip to Paris," which are represented by the widgets 810, 820, and 830, respectively. In operation, managing these pending tasks may involve taking such actions as removing a task from future consideration, adding a task, altering a scope of a task, or activating/deactivating a task.

Figure 9:
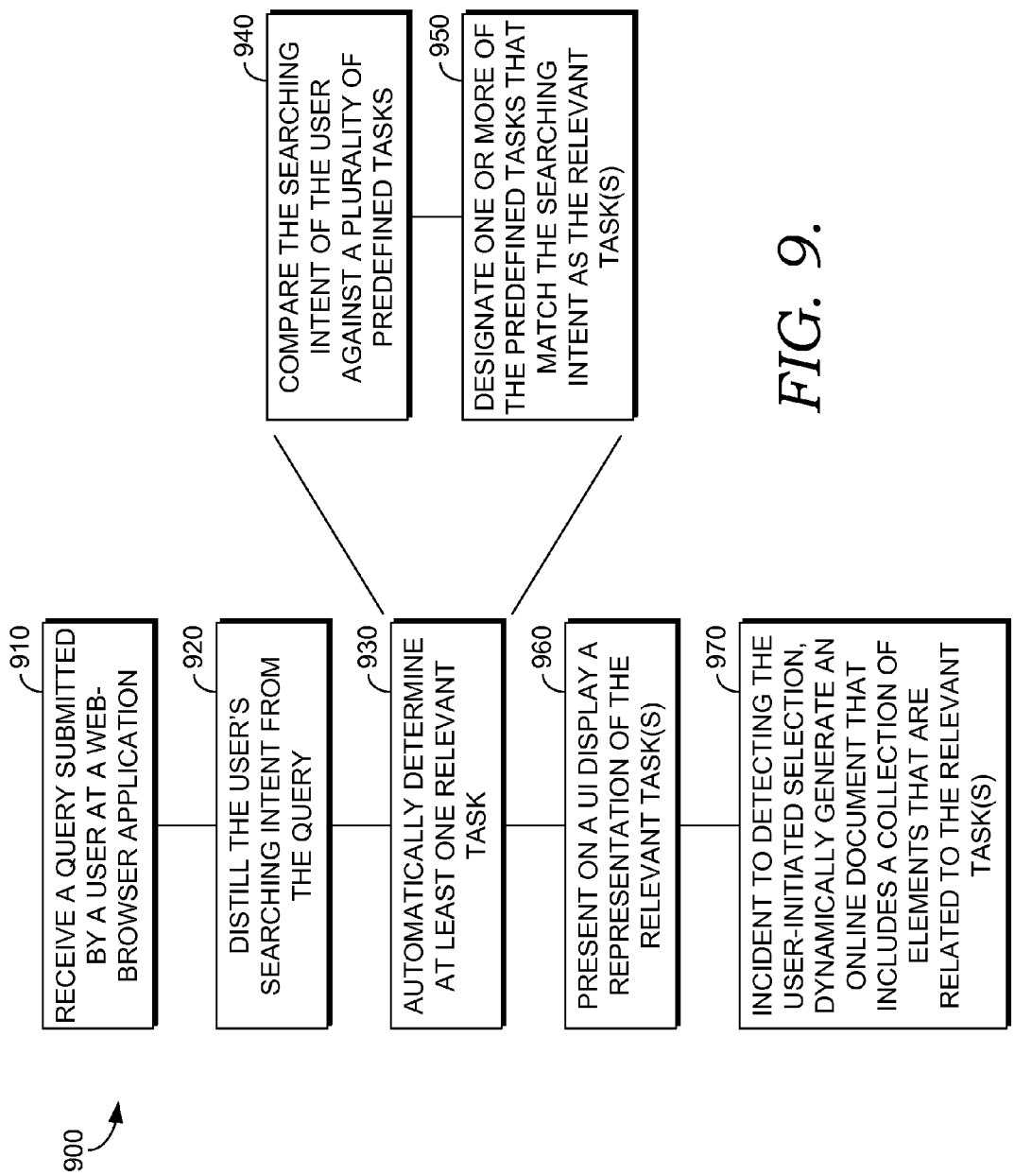
FIG. 9 is a flow diagram illustrating an overall method for gathering related navigation events for publishing in a collection, in accordance with an embodiment of the present invention.

Turning now to FIG. 9, a flow diagram illustrating an overall method 900 for gathering related navigation events for publishing in a collection is shown, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, as more fully described above, the method 900 involves receiving a query, as depicted at block 910. The query is typically submitted by a user at a web-browser application, which is in operable communication with a search engine. As depicted at block 920, the user's searching intent may be distilled from the query.

In an exemplary embodiment, as depicted at block 930, at least one relevant task may be automatically determined via a process that includes at least the following steps: comparing the searching intent of the user against a plurality of predefined tasks (see block 940); and designating one or more of the predefined tasks that match the searching intent as the relevant task(s) (see block 950). The method 900 may continue by presenting on a UI display a representation of the relevant task(s) and by detecting a user-initiated selection directed toward the representation of the relevant task(s), as depicted at block 960. Incident to detecting the user-initiated selection, as depicted at block 970, an online document that includes the collection of elements that are related the relevant task(s) may be dynamically generated.

Figure 10:
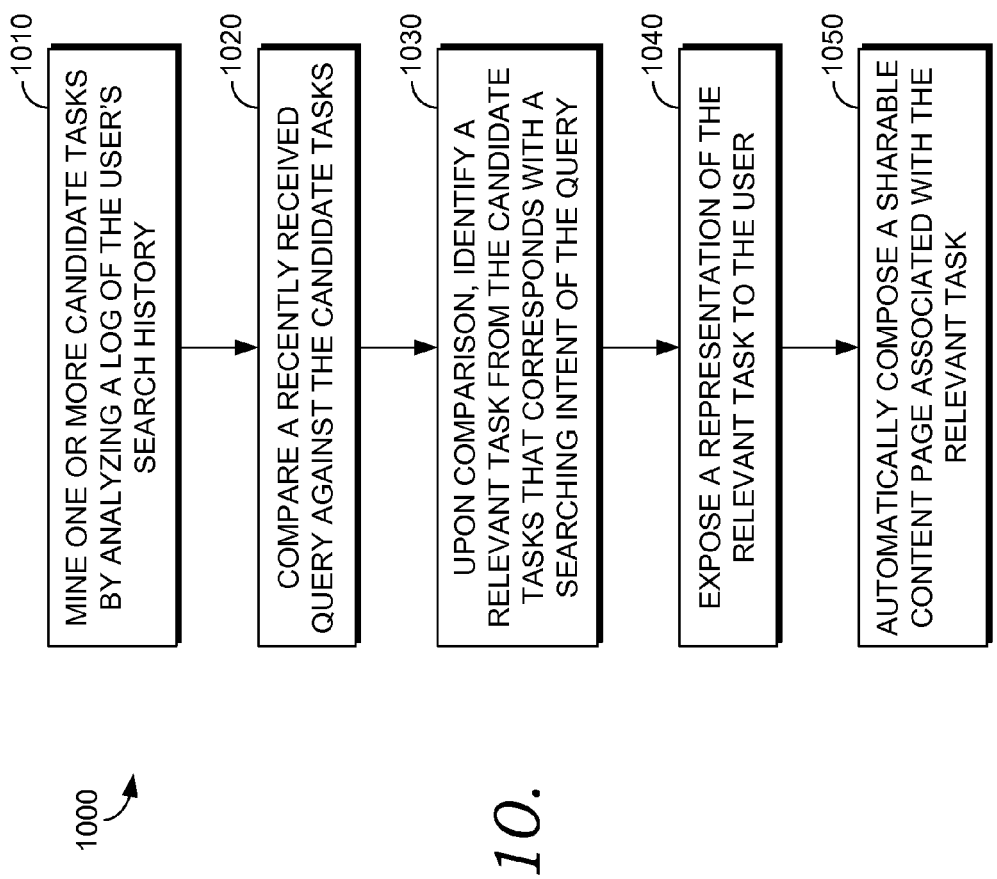
FIG. 10 is a flow diagram illustrating an overall method for identifying and sharing a task that captures a user's searching intent, in accordance with an embodiment of the present invention.

Turning now to FIG. 10, a flow diagram illustrating an overall method 1000 for identifying and sharing a task that captures a user's searching intent is shown, in accordance with an embodiment of the present invention. As depicted at block 1010, the method 1000 includes the step of mining one or more candidate tasks by analyzing a log of the user's search history. Typically, the candidate tasks each represent a topical concept that is abstracted from at least one navigation event. At some point, a recently received query may be compared against the candidate task(s), as depicted at block 1020. Upon comparison, a relevant task may be identified from the candidate task(s), as depicted at block 1030. Typically, the relevant task corresponds with a searching intent of the query.

The method 1000 may further include the step of exposing a representation (e.g., link, widget, module on a task bar, or instant answer) of the relevant task to the user, as depicted at block 1040. Incident to the user targeting a selection-action upon the relevant-task representation, a sharable content page (e.g., the task-results page 600 of FIG. 6) associated with the relevant task may be automatically exposed, as depicted at block 1050. Typically, the sharable content page generally includes elements that reflect navigation events drawn from the user's log of search history or automatically generated suggestions of web pages that share a semantically common concept with the relevant task.

As more fully discussed above, the exposed representation of the relevant task may include a control that allows the user to post a link of the sharable content page to one or more contacts via a social network. Generally, the user is enabled to choose which contacts s/he prefers to receive feedback from regarding the sharable content page when completing the relevant task. Further, the sharable content page is capable of publishing comments provided by the contacts upon the contacts selecting the posted link and submitting feedback.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for gathering related elements for publishing in a collection, the method comprising:
    receiving a query, submitted by a user, at a web-browser application in operable communication with a search engine;
    distilling the user's searching intent from the query;
    automatically determining at least one relevant task via a process comprising:
        (a) inspecting one or more candidate tasks within a log of the user's search history, wherein the one or more candidate tasks represent a respective semantic concept that is abstracted from at least one navigation event within the user's search history;
        (b) comparing the searching intent of the user against the one or more candidate tasks; and
        (c) based on, in part, the comparison, designating at least one of the one or more candidate tasks that match the searching intent as the at least one relevant task;
    presenting on a UI display a representation of the at least one relevant task;
    detecting a user-initiated selection directed toward the representation of the at least one relevant task; and
    incident to detecting the user-initiated selection, dynamically generating an online document that includes the collection of elements that are related to the at least one relevant task.

2. The media of claim 1, wherein the elements include navigation events comprising at least one of queries, clicked-through links, or websites that have been visited.

3. The media of claim 2, wherein the navigation events are drawn from a search history stored in a log associated with the user.

4. The media of claim 2, wherein the navigation events are drawn from general searching behavior stored in a log associated with various users that are demographically situated with the user.

5. The media of claim 1, wherein dynamically generating an online document comprises preparing a shareable content page that suggests the elements that align with a topic of the at least one relevant task.

6. The media of claim 1, wherein presenting on a UI display a representation of the at least one relevant task comprises automatically issuing a prompt incorporated with search results that are responsive to the query.

7. The media of claim 6, wherein the prompt is configured as a widget that notifies the user the at least one task is being recommended.

8. The media of claim 7, wherein presenting on a UI display a representation of the at least one relevant task comprises surfacing a task bar that includes modules that, upon receiving user interaction, reveal information concerning the at least one relevant task.

9. The media of claim 8, wherein the modules on the task bar are dynamically modified in accordance with a context of an ongoing search session.

10. A computerized method, carried out by a processing unit, for identifying and sharing a task that captures a user's searching intent, the method comprising:
    mining one or more candidate tasks by analyzing a log of the user's search history, wherein the one or more candidate tasks each represent a semantic concept that is abstracted from at least one navigation event within the search-history log;

comparing a searching intent derived from a recently received query against the one or more candidate tasks;

upon comparison, identifying a relevant task from the one or more candidate tasks that corresponds with the searching intent of the query;

exposing a representation of the identified relevant task to the user; and automatically composing a sharable content page associated with the relevant task, wherein the sharable content page includes first elements that reflect navigation events drawn from the search-history log and second elements that reflect automatically provided information outside the search-history log that substantially aligns with the user's searching intent.

11. The method of claim 10, wherein the first elements of the sharable content page indicate the navigation events of the user's log of search history that share a semantically common concept with the relevant task.

12. The method of claim 10, wherein the searching intent is derived by parsing the query upon receipt at a search engine.

13. The method of claim 10, further comprising writing navigation events of a search session within the user's log of search history.

14. The method of claim 13, grouping the navigation events within the user's log of search history into the one or more candidate tasks that respectively share a semantically common concept.

15. The method of claim 10, wherein the exposed representation of the relevant task includes a link that directs the user to the sharable content page.

16. The method of claim 10, wherein automatically composing a sharable content page comprises selecting for display as the first elements links to suggested web pages that share a semantically common concept with the relevant task.

17. The method of claim 10, wherein exposed representation of the relevant task includes a control that allows the user to post a link of the sharable content page to one or more contacts via a social network.

18. The method of claim 17, wherein the sharable content page is capable of publishing comments provided by the contacts upon the contacts invoking the posted link.

19. A computer system for recognizing that a user is carrying out a task and for providing a collection of elements that advances the task, the computer system comprising a processing unit coupled to a computer-storage medium, the computer-storage medium having stored thereon a plurality of computer software components executable by the processing unit, the computer software components comprising:

a query classifier for passively recognizing, during an ongoing search session, a searching intent of at least one navigation event implemented by the user;

a collections component for categorizing navigation events previously implemented by the user into one or more candidate tasks and for selecting a task from the one or more candidate tasks that is relevant to the user's searching intent;

a search engine for generating search results that are responsive to a query submitted by the user; and a user experience layer for rendering a representation of the relevant task in conjunction with the search results within a search-results page.

20. The computer system of claim 19, wherein the collections component is configured for composing a sharable content page using first elements drawn from the navigation events stored within a log associated with the user and automatically suggested second elements that relate to the relevant tasks and for sharing the sharable content page with the user's contacts within one or more social networks.

* * * * *